United States Patent
Li et al.

(10) Patent No.: US 8,185,269 B2
(45) Date of Patent: May 22, 2012

(54) ACTIVE SUSPENSION SYSTEM FOR A VEHICLE AND METHOD OF OPERATING THE SAME

(75) Inventors: Yunjun Li, West Bloomfield, MI (US); Timothy J. Herrick, Rochester Hills, MI (US); Nancy McMahon, Rochester Hills, MI (US); Steven A. Opiteck, South Lyon, MI (US); John X. Cui, Rochester Hills, MI (US); Loren J. Majersik, Ann Arbor, MI (US); Nathan A. Wilmot, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 510 days.

(21) Appl. No.: 12/335,946

(22) Filed: Dec. 16, 2008

(65) Prior Publication Data

US 2010/0152969 A1 Jun. 17, 2010

(51) Int. Cl.
*B60G 17/0165* (2006.01)
*B60G 17/0195* (2006.01)

(52) U.S. Cl. .............. 701/37; 280/5.514; 280/5.517; 280/6.157; 280/5.501

(58) Field of Classification Search .............. 701/37; 280/5.514, 5.517, 6.15, 6.157, 5.501
See application file for complete search history.

(56) References Cited

U.S. PATENT DOCUMENTS

| | | | | |
|---|---|---|---|---|
| 4,718,695 A * | 1/1988 | Kawagoe | ............... | 280/6.157 |
| 5,141,245 A * | 8/1992 | Kamimura et al. | ........ | 280/5.514 |
| 5,504,482 A * | 4/1996 | Schreder | ............... | 340/995.13 |
| 5,899,288 A * | 5/1999 | Schubert et al. | ........... | 180/89.12 |
| 6,009,374 A * | 12/1999 | Urahashi | ............... | 701/209 |
| 6,665,597 B1 * | 12/2003 | Hanser et al. | ............ | 701/37 |
| 6,763,292 B1 * | 7/2004 | Smith et al. | ............ | 701/37 |
| 7,009,500 B2 * | 3/2006 | Rao et al. | ............ | 340/435 |
| 7,334,801 B2 * | 2/2008 | Hohmann | ............... | 280/5.518 |
| 7,512,495 B2 * | 3/2009 | Obradovich | ............ | 701/301 |
| 7,513,508 B2 * | 4/2009 | Malit | ............... | 280/5.518 |
| 7,761,205 B2 * | 7/2010 | Onuma et al. | ............ | 701/36 |
| 2003/0225495 A1 * | 12/2003 | Coelingh et al. | ............ | 701/48 |
| 2005/0021205 A1 * | 1/2005 | Niwa et al. | ............ | 701/37 |
| 2005/0080530 A1 * | 4/2005 | Arduc et al. | ............ | 701/37 |
| 2005/0090938 A1 * | 4/2005 | Ranelli | ............ | 701/1 |
| 2005/0090956 A1 * | 4/2005 | Ogawa | ............ | 701/37 |
| 2006/0155469 A1 * | 7/2006 | Kawasaki | ............ | 701/301 |
| 2006/0253240 A1 * | 11/2006 | Rao et al. | ............ | 701/48 |
| 2007/0021886 A1 * | 1/2007 | Miyajima | ............ | 701/37 |
| 2007/0168092 A1 * | 7/2007 | Knox et al. | ............ | 701/37 |
| 2009/0033044 A1 * | 2/2009 | Linsmeier | ............ | 280/5.514 |

FOREIGN PATENT DOCUMENTS

| | | |
|---|---|---|
| DE | 10338875 A1 | 3/2005 |
| DE | 102006018658 A1 | 10/2007 |
| DE | 102008052134 A1 | 4/2009 |
| JP | 2000-322695 A * | 11/2000 |
| WO | WO2005021297 A1 | 3/2005 |
| WO | WO2009053330 A1 | 4/2009 |

* cited by examiner

*Primary Examiner* — Ruth Ilan
(74) *Attorney, Agent, or Firm* — Lionel D. Anderson; Reising Ethington P.C.

(57) ABSTRACT

An active suspension system and method for controlling the height of a vehicle. In an exemplary embodiment, the active suspension system receives information from one or more input sources, including both internal and external vehicle inputs, and uses that information to actively control the vehicle height. By doing so, the active suspension system can reduce aerodynamic drag on the vehicle and improve the vehicle's fuel economy, ride comfort, handling, and other aspects of operation. Some examples of external vehicle inputs that may be used include: short-range road and vehicle information, as well as long-range traffic, road and route information.

22 Claims, 3 Drawing Sheets

ACTIVE SUSPENSION SYSTEM FOR A VEHICLE AND METHOD OF OPERATING THE SAME

TECHNICAL FIELD

The present invention generally relates to a vehicle suspension system and, more particularly, to an active suspension system that uses various inputs to actively level or otherwise adjust a vehicle height.

BACKGROUND

The 'vehicle height', also called the trim height, generally refers to the height at which the vehicle rides above the ground. Skilled artisans will appreciate that there are a variety of ways to measure the vehicle height, including the method illustrated in FIG. 1. In that figure, a vehicle 10 is shown having a front vehicle height H1 measured between the ground and the top of the vehicle's front wheel well, and a rear vehicle height H2 measured between the ground and the top of the rear wheel well. Other methods and reference points could be used for determining vehicle height.

Different suspension systems have been used to adjust or control the vehicle height, these include semi-active, active, fully-active, and interconnected suspension systems (hereafter collectively referred to as 'active suspension systems'), to name a few. One type of active suspension system uses an air compressor to control the air volume in the system, which in turn raises and lowers the vehicle height, as is known to those skilled in the art. Other systems and techniques could also be used to control or manipulate the vehicle height.

SUMMARY OF THE INVENTION

According to one embodiment, there is provided a method of controlling an active suspension system for a vehicle. The method may comprise the steps of: (a) receiving one or more external vehicle input(s); (b) using the external vehicle input(s) to determine a proposed vehicle height; and (c) adjusting the active suspension system to the proposed vehicle height.

According to another aspect, there is provided an active suspension system for a vehicle. The active suspension system may comprise a suspension control module electronically coupled to one or more internal vehicle input(s) and one or more external vehicle input(s); an actuator controlled by the suspension control module; and a sprung mass mechanically coupled to the actuator. The suspension control module uses information from the internal and external vehicle input(s) to drive the actuator and control a vehicle height.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The active suspension system and method described herein can be used to control the height of a vehicle when it is being operated. In the exemplary embodiment shown in FIG. 2, active suspension system 12 receives information from one or more input sources 60-64 and uses that information to actively control the vehicle height or level setting. By doing so, active suspension system 12 can reduce aerodynamic drag on the vehicle and improve vehicle fuel economy, ride comfort, handling, and other aspects of operation. Although the following description is provided in the context of a pneumatic system that separately controls front and rear vehicle heights H1, H2, it should be appreciated that other embodiments could be used as well. This includes, for example, active suspension systems having hydraulic, electrical, and/or mechanical devices, as well as active suspension systems that control the vehicle height on an individual corner basis (i.e., four corner independently controlled vehicle heights), on an axle-by-axle basis (i.e., front axle and rear axle vehicle heights), or a single vehicle height for the entire vehicle. Active suspension system 12 could be used with tractor trailers, commercial and non-commercial trucks, recreational vehicles (RVs), sports utility vehicles (SUVs), cross-over vehicles, passenger cars, as well as any other motorized vehicle.

Active suspension system 12 may be connected to a variety of sensors, devices, components, modules, and other input sources located throughout the vehicle. These include speed sensors, longitudinal and lateral acceleration sensors, laser, radar, ladar and ultrasonic sensors, cruise control modules, brake modules, fuel management systems, vision systems, navigation systems, telematics units, as well as any other suitable input source that can provide pertinent information to active suspension system 12. It should be appreciated that the various input sources can be embodied in software or hardware, they can be stand-alone devices or they can be integrated into other devices such as vehicle electronic modules, and they can be directly connected to active suspension system 12 or they can be connected via a communications bus or the like, to cite a few possibilities.

Figure 2:
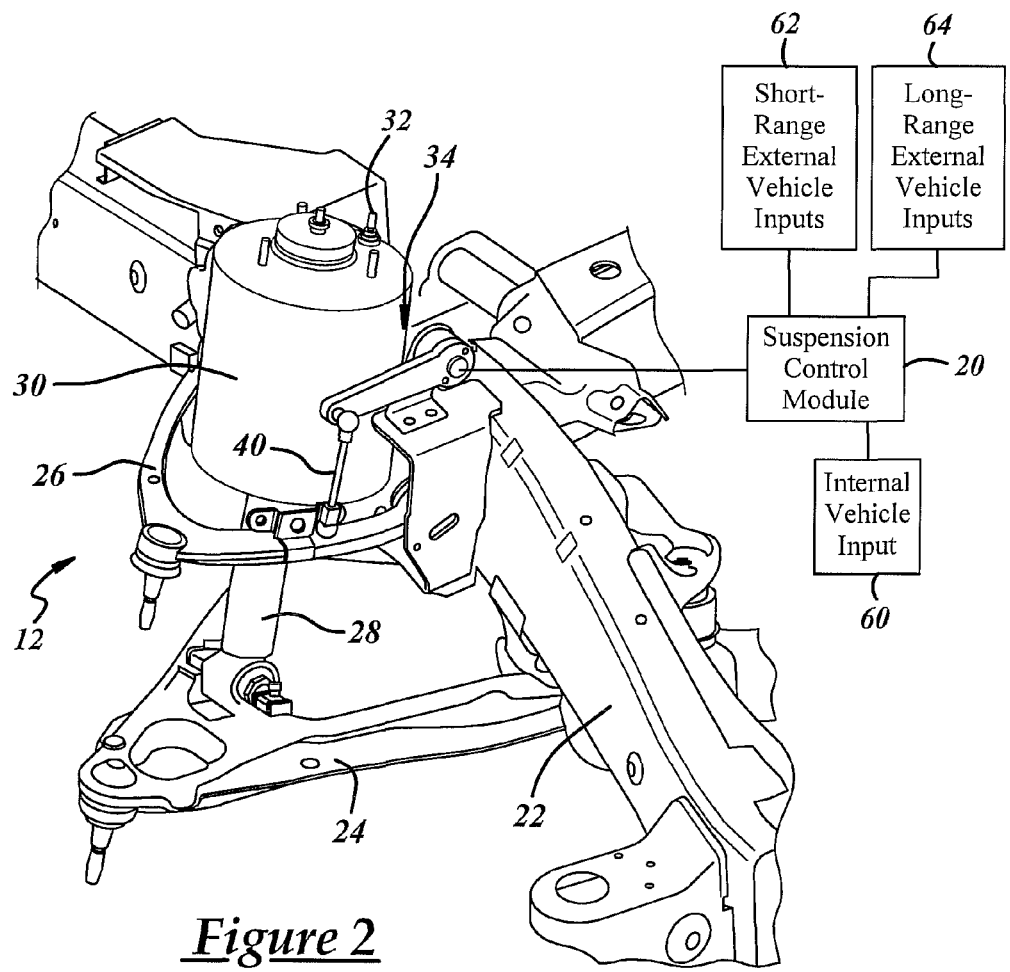
FIG. 2 is a perspective and schematic view of an exemplary active suspension system that may be used with the vehicle of FIG. 1.

In FIG. 2, there is shown a perspective and schematic view of an exemplary active suspension system 12. In this particular embodiment, active suspension system 12 includes a suspension control module 20, a frame or body portion 22 (the sprung mass), lower and upper control arms 24, 26 (the unsprung mass), a shock or damper 28, an air spring 30, an air fitting 32, and a vehicle height sensor 34. Suspension control module 20 may include any suitable combination of hardware and software known in the art and is not limited to the schematic depiction shown in FIG. 2. This includes, but is not limited to, a suspension control module that is a stand-alone module and one that is integrated or combined with some other vehicle electronic module (e.g., a chassis control module). In order to make changes to the vehicle height, suspension control module 20 controls an air compressor (not shown here) whose output is in fluid communication with air fitting 32 and air spring 30.

As the air volume in air spring 30 increases and decreases, so too does an axial extension of the air spring. This causes air spring 30 and damper 28, or any other air-driven actuator, to control the distance between lower control arm 24 (unsprung mass) and body portion 22 (sprung mass), which in turn controls the vehicle height at that corner. It should be appreciated that while the preceding description is directed to a pneumatic or air suspension embodiment, other types of active suspension systems could also be used. The term 'actuator' broadly refers to any type of suspension component—pneumatic, hydraulic, mechanical, electrical or otherwise—that can be used to raise and/or lower the height of a vehicle. The term 'unsprung mass' generally refers to the portion of the vehicle's mass that is suspended below the suspension system (this generally includes the wheels, wheel bearings, brake rotors control arms, etc.). And the term 'sprung mass' generally refers to the portion of the vehicle's mass that is supported above the suspension system (this generally includes the body, frame, internal components, etc.).

Vehicle height sensor 34 is coupled to suspension control module 20 and can measure the vehicle height by monitoring the position of upper control arm 26, which moves in unison with lower control arm 24. In the exemplary embodiment shown here, vehicle height sensor 34 includes a Hall-effect element and a mechanical link 40 and translates linear movement of the link, which is caused by movement in upper control arm 26, into rotational movement of the sensor. Other types of vehicle height sensors could be used, as the Hall-effect embodiment is only one example.

Figure 1:
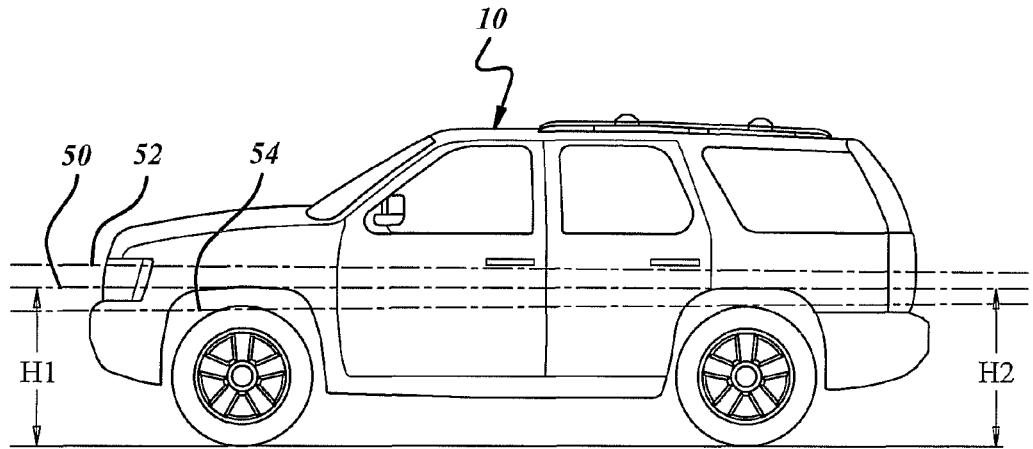
FIG. 1 is a side view of an exemplary vehicle that may be equipped with an active suspension system, where different vehicle heights and level settings are illustrated.

FIG. 1 shows several different exemplary vehicle heights and level settings. A default vehicle height setting 50 may be used when the vehicle is experiencing typical driving conditions, as will be explained. A raised vehicle height setting 52 may be used for certain off-road and other conditions that warrant raising the vehicle height. And a lowered vehicle height setting 54 may be used when the vehicle is cruising or otherwise experiencing conditions where it is advantageous to reduce aerodynamic drag on the vehicle. The different vehicle heights can have similar or dissimilar orientations or level settings; that is, they can be parallel to one another or they can be slanted. For instance, the lowered vehicle height setting 54 has the front or nose of the vehicle lower than the rear of the vehicle such that the vehicle is slanted slightly downward; this orientation or level setting can be advantageous for aerodynamic purposes. Vehicle height and level settings are hereafter collectively referred to as 'vehicle height'. It should be appreciated that the vehicle height settings shown in FIG. 1 are simply for purposes of illustration and actual vehicle height settings could vary. Moreover, the system and method described herein can be used with any type of vehicle suspension system that is capable of controlling, adjusting, or manipulating a vehicle height, and are not limited to the particular embodiments provided here for purposes of explanation.

Figure 3A:
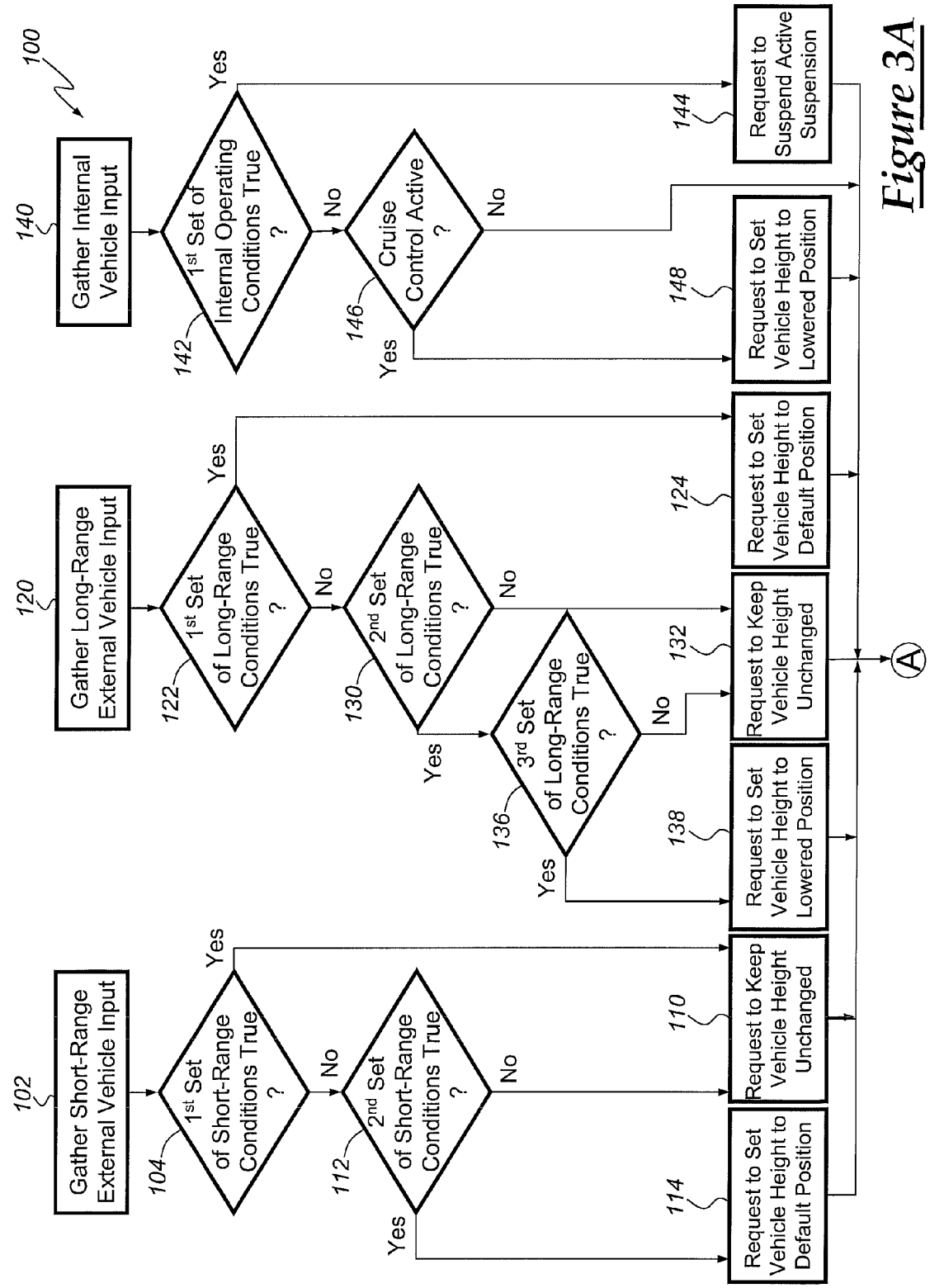
FIGS. 3A-B are flowcharts of an exemplary method for controlling an active suspension system, such as the one shown in FIG. 2.
Figure 3B:
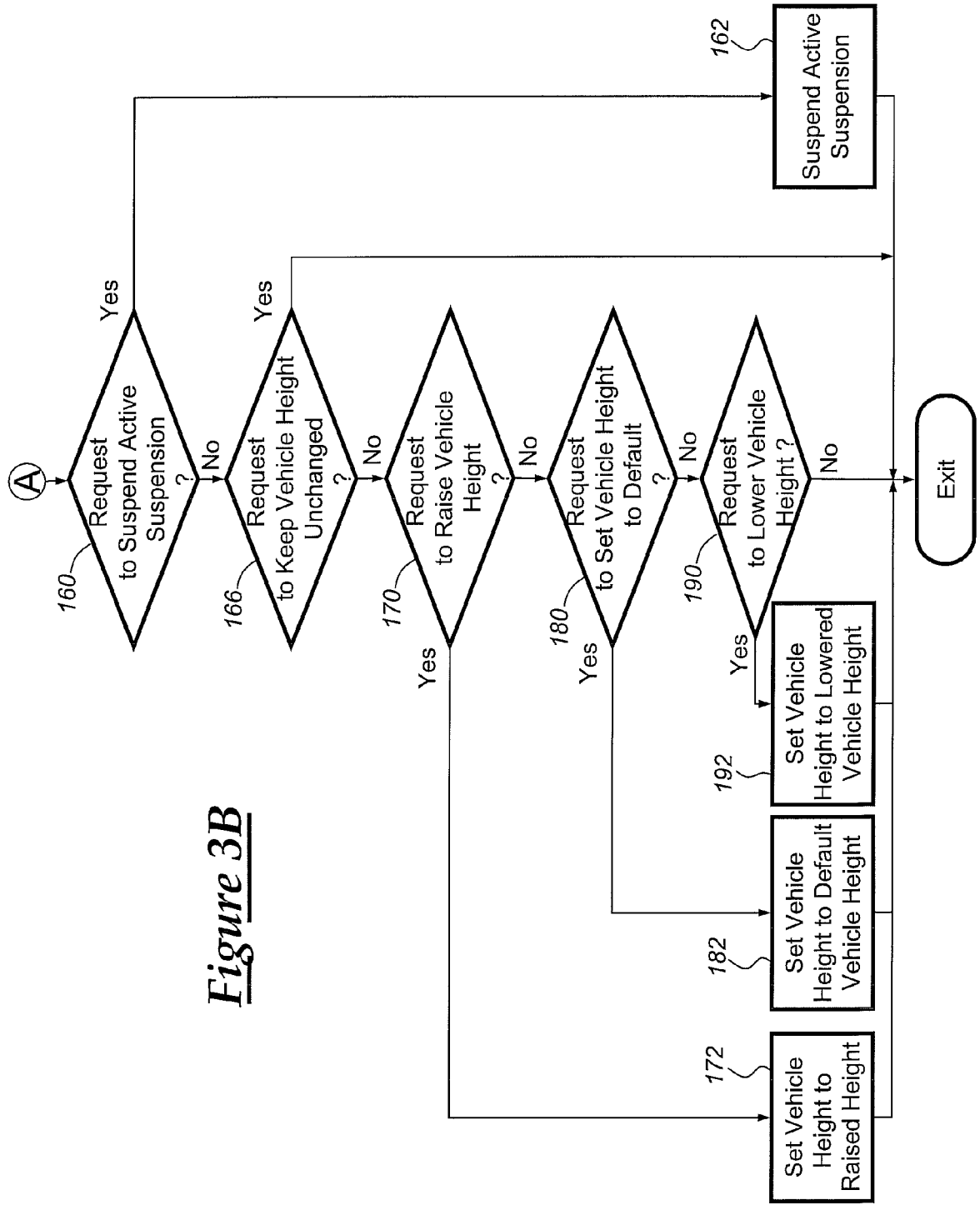

Turning now to FIGS. 3A-B, there is shown an exemplary method 100 for controlling an active suspension system, such as system 12. According to this particular embodiment, method 100 utilizes a variety of different vehicle inputs to control the active suspension system and, more particularly, to manipulate the vehicle height so that fuel efficiency, ride comfort, ride handling, or some other operating parameter is optimized. Although the flowchart of FIGS. 3A-B shows these inputs being used according to a particular embodiment, it should be appreciated that various combinations and sequences of steps, including ones not shown here, could be used instead of the exemplary one described below. For example, method 100 could begin with steps 120 or 140 instead of step 102, or it could process multiple steps concurrently, to name a few possibilities. In any event, method 100 may gather vehicle inputs from a variety of sources, including any combination of internal vehicle inputs 60, short-range external vehicle inputs 62, and long-range external vehicle inputs 64, for example.

An "internal vehicle input" broadly includes any input that is provided by a vehicle-mounted sensor, device, component, module, etc. and that pertains to one or more conditions occurring in or involving the vehicle. Some examples of internal vehicle inputs 60 include: a vehicle speed, a vehicle acceleration (e.g., lateral or longitudinal acceleration), a steering wheel angle, a transmission or gear setting (e.g., park, neutral, drive, reverse, etc.), a cruise control status, a towing status, a braking status, a suspension system status, a fuel management system status, etc. The preceding list of internal vehicle input examples is not exhaustive, of course, as others could also be used. Typically, an internal vehicle input is sent from a sensor or other device to suspension control module 20 via a communications bus or other communications network.

A "short-range external vehicle input" broadly includes any input that pertains to an object, condition, surrounding, environment, etc. that is outside of the vehicle and can be determined by a vehicle-mounted sensor, device, component, module, etc. Some examples of short-range external vehicle inputs 62 include: short-range road information (e.g., road surface data provided by a vehicle-mounted vision system), short-range vehicle information (e.g., the distance and speed of nearby vehicles as provided by laser, radar, ladar, or ultrasonic sensors), and short-range traffic information (e.g., signals transmitted by nearby traffic information broadcasting systems), to name a few. In the example of short-range road information, a vehicle-mounted vision system may include a camera that is located near the front of vehicle 10 and takes digital images of the upcoming road surface. The results can then be provided to suspension control module 20 in the form of short-range external vehicle inputs. It is also possible to have one or more laser, radar, ladar and/or ultrasonic sensors mounted around vehicle 10 sense the presence, position, distance, speed, acceleration, etc. of other nearby vehicles. This information could be provided to suspension control module 20 in the form of short-range vehicle information. In an example of short-range traffic information, a traffic broadcasting system broadcasts wireless information that may pertain to upcoming stop signs, traffic lights, intersections, etc. In that case, a vehicle-mounted receiver receives wireless signals from the traffic broadcasting system which alerts nearby vehicles to the presence of one or more of the aforementioned items. As stated above, other types of short-range external vehicle inputs could also be used.

A "long-range external vehicle input" broadly includes any input that pertains to a road, road feature, road characteristic, route, traffic, surrounding environment, etc. and can be determined by a navigational device, system or network. Typically, long-range external vehicle input cannot be solely determined by a vehicle-mounted sensor, device, component, module, etc., as other sources of information like a GPS system are usually required. Some examples of long-range external vehicle inputs 64 include: long-range traffic information (e.g., traffic patterns determined by a GPS-based navigation system); long-range road information (e.g., speed limits and road types provided by a GPS-based navigation system); or long-range route information (e.g., a destination or other aspect of a calculated navigational route), to cite a few examples. In the case of long-range traffic information, a GPS-based navigation system could receive traffic pattern data from a back-end facility and use the current position of the vehicle to determine if any traffic backups or other impediments were expected in the upcoming route; this information could then be provided to suspension control module 20 in the form of a long-range external vehicle input. Information on upcoming exit ramps, stretches of road, speed limit changes, transitions from one type of road to another, or the distance to the vehicle's intended destination, for example, could also be determined by a GPS-based navigation system and provided to suspension control module 20 in the form of long-range external vehicle input. Again, other examples could also be used.

Beginning with step 102, short-range external vehicle input is gathered from one or more sources. As mentioned above, short-range external vehicle input may include short-range road information, short-range vehicle information, and short-range traffic information, for example. Once the short-range external vehicle input is acquired, step 104 may check to see if a first set of short-range conditions are true.

Put differently, step 104 looks for certain imminent or short-range conditions that may make active adjustment of the vehicle height less than ideal. Although the first set of short-range conditions—also referred to as 'cautionary short-range conditions'—may be determined based on a variety of input sources, it is preferable that step 104 evaluate one or more short-range external vehicle inputs 62 in order to determine if such cautionary conditions exist. Some examples of cautionary short-range conditions include: approaching traffic lights, stops signs, and other objects identified by a traffic broadcasting system; a rough or bumpy road surface as detected by a vehicle-mounted vision system; and a vehicle or other obstacle detected in the vehicle's lane by laser, radar, ladar, or ultrasonic sensors. In each of the preceding examples, short-range external vehicle input is used to evaluate a first set of short-range conditions, although other input sources could be used instead. If the first set of short-range conditions are deemed true, step 110 can maintain the current vehicle height until such conditions abate. If the first set of short-range conditions are deemed to not exist, then method 100 is free to continue on with the process of active vehicle height control.

Step 112 may then check to see if a second set of short-range conditions exist. In an exemplary embodiment, step 112 evaluates one or more short-range external vehicle inputs to try and determine if the vehicle height should be set to a default or normal height. Put differently, there are some conditions that may justify leveling the vehicle to a default vehicle height that is empirically or analytically determined during testing and development of the vehicle. Each vehicle or family of vehicles may have a unique default vehicle height, which can be based on the particular design and operational characteristics of that vehicle; for example a truck would likely have a different default vehicle height than a passenger car. For example, if vehicle-mounted sensors indicate a speed-limited zone due to road flooding (short-range road information) or if they detect the presence of a traffic backup (short-range vehicle information), then step 112 may determine that a default vehicle height is appropriate. If such conditions exist, then step 112 can send control signals to suspension control module 20 to achieve the default vehicle height, step 114. If step 112 does not find any of the second set of short-range conditions to be true, then the vehicle height is kept unchanged at step 110.

Step 120 gathers long-range external vehicle input from one or more sources. As already mentioned, long-range external vehicle input may include long-range traffic information, long-range road information and long-range route information, to cite a few examples. Once long-range external vehicle input is acquired, step 122 may check to see if a first set of long-range conditions are true.

In step 122, the method looks for a first set of long-range conditions that warrant setting the vehicle height to the default vehicle height. Some examples of long-range conditions that may cause step 122 to set the vehicle height to a default include: if a GPS-based navigation system indicates that the vehicle is entering a stretch of road having a lower speed limit (e.g., going from a paved road to an unpaved road); if a GPS-based navigation system determines that the vehicle is within a predetermined distance of its intended destination (e.g., within 5 miles of the destination); or if a GPS-based navigation system or onboard sensors determine that the vehicle is exiting onto a highway off-ramp. Again, the preceding are only examples of some of the possible input sources that could be used to detect a first set of long-range conditions; other inputs and conditions can also be used. Although a default vehicle height may not be as fuel efficient as a lower one, it may be more suitable for certain road conditions and situations. If step 122 determines that such conditions exist, then step 124 can send control signals to the vehicle suspension system to set the vehicle height to the default vehicle height, as described above.

Step 130 checks a second set of long-range conditions. According to an exemplary embodiment, step 130 may look for one or more of the following conditions: has the vehicle speed been within a predetermined range for a predetermined period (e.g., vehicle speed has not fluctuated more than 3 mph for at least 5 min or 5 miles); and is the destination of the vehicle's route beyond a certain distance or is it not specified. These are only examples of some of the inputs, conditions, etc. that may be monitored. If step 130 determines that the second set of long-range conditions is not true, then step 132 will keep the vehicle height unchanged. If, however, the second set of long-range conditions is deemed true, then the method proceeds to step 136 to determine if the vehicle height can be lowered.

In an exemplary embodiment, step 136 evaluates a third set of long-range conditions that include determining if the vehicle has been driven on a certain type of road for a certain amount of time (e.g., has it been driven on an interstate or county highway for a certain period of time or distance). If step 136 determines that none of the third set of long-range conditions is deemed true, then the vehicle height can remained unchanged, step 132. If, however, the third set of long-range conditions is deemed to be true, then step 138 can lower the vehicle height. Generally speaking, the lower the vehicle height, the less aerodynamic drag on the vehicle and the better its fuel economy. Skilled artisans will appreciate that any number of algorithms and techniques could be employed for determining an optimum vehicle height to improve the fuel-efficiency, ride comfort, handling, or other operational aspects of the vehicle.

Step 138 generates a request to set the vehicle height to a lowered position, and can use one of a number of techniques for doing so. For instance, step 138 could simply use one or more predetermined lowered vehicle heights. These heights could have been empirically or analytically determined through vehicle tests/development, analysis or through other means. In order to select from the different predetermined lowered vehicle heights, step 138 could employ a vehicle speed versus vehicle height relationship or it could use other inputs. In one embodiment, step 138 uses various long-range external vehicle inputs to select an appropriate lowered vehicle height. If, for example, a GPS-based navigation system indicates the vehicle is expected to drive on a two-lane county road for a certain distance, then a first lowered vehicle height of −20 mm may be selected (this distance is generally representative of the delta between a normal or default vehicle height and a particular lowered vehicle height, and is merely exemplary). If the vehicle is expected to drive on a larger state road for a certain distance, then a second lowered vehicle height of −30 mm may be selected. And if the vehicle is expected to drive on a divided interstate highway for a certain distance, then a third lowered vehicle height of −40 mm may be selected. In this way, step 138 may choose between different vehicle heights based on long-range external vehicle input; namely, the type of road on which vehicle 10 is expected to travel. This can be useful for a variety of reasons, not least of which is that it can make the vehicle more fuel efficient by actively adjusting the vehicle height based on the environment in which it is operating.

Step 140 gathers internal vehicle input from one or more sources. As mentioned above, some examples of internal vehicle inputs 60 include: a vehicle speed, a vehicle corner height, a vehicle acceleration (e.g., lateral or longitudinal acceleration), a steering wheel angle, a transmission or gear setting (e.g., park, neutral, drive, reverse, etc.), a cruise control status, a towing status, a braking status, a suspension system status, a fuel management system status, etc.

Step 142 uses the different vehicle inputs to determine if a first set of internal operating conditions exist that may warrant temporarily suspending the active suspension system—also referred to as cautionary conditions. Put differently, there are certain internal operating conditions involving the vehicle—such as when the vehicle is accelerating at a significant rate or when an air leak is detected in the active suspension system—that may make it undesirable for method 100 to engage in active control or manipulation of the vehicle height. The determination made in step 142 could be based on internal vehicle inputs 60, other information, or a combination thereof. In one embodiment, step 142 evaluates cautionary conditions by reviewing internal vehicle inputs 60 to determine if anything of concern is occurring in or to vehicle 10. The following list includes some exemplary cautionary conditions that may be checked for: vehicle acceleration, steering wheel angle, lateral acceleration, or some other measured parameter that exceeds a predetermined threshold; a vehicle rolling condition, pitching condition or jacking condition; a leak or other malfunction in the vehicle suspension system; application of the vehicle brakes; or a vehicle overload, limited engine torque, or open door condition. These are, of course, only some of the possible cautionary conditions that could be evaluated. If step 142 determines that one or more of these cautionary conditions exist, then method 100 may issue a request to temporarily inhibit or suspend the active suspension system, step 144. If none of these cautionary conditions exist, then method 100 may proceed.

Next, step 146 checks to see if the vehicle's cruise control is active. Although this step is optional, it provides method 100 with the ability to engage in active leveling when the cruise control is 'on'. An active cruise control suggests that the driver intends to operate vehicle 10 at or near the current vehicle speed for some time; a somewhat stable condition that is oftentimes appropriate for operation of an active suspension system. If the cruise control is active, step 148 may choose from among one or more lowered vehicle heights and adjust the vehicle height accordingly. In an exemplary embodiment, step 148 correlates vehicle speed or some other internal vehicle input 60 to a lowered vehicle height for optimum aerodynamic performance. For example, vehicle speeds between 0-50 mph could result in a first lowered vehicle height of −20 mm (the distance is representative of the delta between a default vehicle height and a lowered vehicle height); vehicle speeds between 51-70 mph could result in a second lowered vehicle height of −30 mm, and vehicle speeds in excess of 70 mph could result in a third lowered vehicle height of −40 mm. The preceding relationships and values are only exemplary, as linear, curved, stepped and other plots could be used to relate vehicle speed or some other input to vehicle height. These relationships are not limited to situations where vehicle speed is increasing, as they can also be used to control the vehicle height in situations where the vehicle speed is decreasing as well. Appropriate data structures like databases, look-up tables, arrays, algorithms, etc. may be maintained and/or used by suspension control module 20 to determine the lowered vehicle height.

At this point, the information gathered in the preceding steps may be provided to some type of suitable arbitration system or method. FIG. 3B illustrates an exemplary embodiment of such an arbitration method, however, other methods and systems could be used as well.

Step 160 checks to see if there is a request to temporarily inhibit or suspend the active suspension system and, if so, then the active suspension system is inhibited in step 162. Inhibiting or halting active suspension system 12 could be initiated in order to prevent subsequent active manipulation of the vehicle height. If there are not any requests for suspension, then the method proceeds to step 166.

Step 166 checks to see if there is a request to keep the vehicle height unchanged. For example, if the method previously performed steps 110 or 132, then step 166 would likely divert control of the method such that it ended. If step 166 does not detect any requests for keeping the vehicle height unchanged, then control of the method may continue to step 170.

Step 170 checks to see if there is a request to raise or elevate the vehicle height. A request to raise the vehicle height could be the result of rough road conditions sensed ahead or a request from the driver, for example. If this step detects a request to raise or elevate the vehicle height, then step 172 can set the vehicle height to some elevated or raised height. In one embodiment, step 172 can actually set the vehicle height by sending an electronic control signal to the appropriate circuitry or motor driver in suspension control module 20 or some other part of active suspension system 12. The control signal can be used to drive an air compressor, which in turn causes the vehicle height to raise or lower accordingly. Vehicle height sensors 34 located at each of the vehicle's four corners can monitor the height and provide feedback to suspension control module 20. Setting the vehicle height can involve moving the sprung mass to a certain height and maintaining it in that position or it can involve an iterative process where the height is constantly monitored and adjusted, to name two possibilities. Other known techniques for monitoring and adjusting vehicle height could also be used. If step 170 does not detect any requests for raising the vehicle height, the method proceeds to step 180.

Step 180 checks to see if any requests have been made to set the vehicle height to the default vehicle height. For example, if the method previously performed steps 114 or 124, then step 180 could divert control of the method to step 182 in order to adjust the current vehicle height to a default or normal vehicle height. If no such requests have been made, then step 180 directs control of the method to step 190 for one additional check.

Step 190 determines if any requests have been made to lower the vehicle height. For example, if the method previously performed steps 138 or 148, then step 190 could send control of the method to step 192 for appropriate vehicle height adjustment. As explained above, lowering the vehicle height may result in a number of benefits, including improved ride comfort, improved handling, improved fuel efficiency, and others. If a request to lower the vehicle height has been made, step 192 could determine and set the lowered vehicle height according to a number of different techniques. Some of the potential techniques include those described above where the lowered height is a function of one or more sensed vehicle inputs.

If step 190 determines that no conditions exist for lowering the vehicle height, then the method can exit without making any changes to the current vehicle height. Again, it should be realized that the method shown in FIGS. 3A-B is merely an illustration of one exemplary embodiment, and that other embodiments with different sequences and combinations of steps, as well as ones with different logic flows may be used instead.

The above-described method may also be used with active suspension systems having different driver-selected modes. For instance, method 100 may be used in conjunction with a manual mode where the driver manually engages a height control feature in order to manipulate the vehicle height up or down. In another example, method 100 may be used with systems that allow the driver to select from different predetermined settings; e.g., a kneeling setting, an aerodynamic setting, a fuel-saving setting, a normal setting, an off-road setting, etc. If a driver were to try and manually manipulate the vehicle height, but one or more short-range or long-range external vehicle inputs suggested cautionary conditions, then the vehicle suspension system may use an override feature to prohibit such manual manipulations until the cautionary conditions change.

In addition to potentially improving the fuel economy, ride comfort, and handling of the vehicle, the system and method described above may also reduce the wear and tear on active suspension system 12, particularly in the case of a pneumatic suspension system. This is due to the fact that method 100 considers more information when determining whether or not to manipulate the vehicle height; thus, the air compressor and other features that control the vehicle height are operated in a more efficient manner and are not unnecessarily driven or cycled. Other benefits could also be enjoyed.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, it is expected that one or more of the exemplary steps shown in method 100 may be part of a loop that continues to monitor and adjust the vehicle height on an ongoing basis. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of controlling an active suspension system for a vehicle, comprising the steps of:
   (a) receiving one or more external vehicle input(s);
   (b) using the external vehicle input(s) to determine if cautionary conditions exist that make adjusting the active suspension system less than ideal and to determine a desired vehicle height that improves the fuel efficiency, ride comfort or ride handling of the vehicle; and
   (c) adjusting the active suspension system from a current vehicle height to the desired vehicle height so that the fuel efficiency, ride comfort or ride handling of the vehicle is improved when there are no cautionary conditions.

2. The method of claim 1, wherein the external vehicle input(s) include at least one input selected from the group of short-range external vehicle inputs consisting of: short-range road information, short-range vehicle information, and short-range traffic information.

3. The method of claim 1, wherein the external vehicle input(s) include at least one input selected from the group of long-range external vehicle inputs consisting of: long-range traffic information, long-range road information, and long-range route information.

4. The method of claim 1, wherein step (a) further comprises receiving external vehicle input in the form of short-range road information that pertains to an upcoming road surface and is provided by a vehicle-mounted vision system.

5. The method of claim 1, wherein step (a) further comprises receiving external vehicle input in the form of short-range vehicle information that pertains to a nearby vehicle and is provided by a vehicle-mounted radar, laser, ladar, or ultrasonic sensor.

6. The method of claim 1, wherein step (a) further comprises receiving external vehicle input in the form of short-range traffic information that is provided by a traffic information broadcasting system and pertains to an upcoming stop sign, traffic light, or intersection.

7. The method of claim 1, wherein step (a) further comprises receiving external vehicle input in the form of long-range road information that is provided by a GPS-based navigation system and pertains to an upcoming exit ramp, stretch of road, or speed limit change.

8. The method of claim 1, wherein step (a) further comprises receiving external vehicle input in the form of long-range route information that is provided by a GPS-based navigation system and pertains to a destination or other aspect of a calculated navigational route.

9. The method of claim 1, further comprising the steps of:
   evaluating one or more external vehicle input(s) that pertain to objects, conditions, surroundings or environments located outside of the vehicle in order to determine if cautionary conditions exist that make adjusting the active suspension system less than ideal; and
   if such cautionary conditions exist then temporarily suspending the active suspension system.

10. The method of claim 1, wherein step (b) further comprises using the external vehicle input(s) to select from a lowered vehicle height for improved fuel efficiency, ride comfort or ride handling, a default vehicle height for typical driving conditions, or a raised vehicle height for certain off-road conditions.

11. The method of claim 1, wherein step (c) further comprises adjusting the active suspension system from the current vehicle height to the desired vehicle height by changing a level setting that reduces the aerodynamic drag on the vehicle so that the front of the vehicle is lower than the rear of the vehicle.

12. A method of controlling an active suspension system for a vehicle, comprising the steps of:
(a) receiving one or more external vehicle input(s) checking the state of a vehicle cruise control;
(b) using the external vehicle input(s) and the state of the vehicle cruise control to determine a desired vehicle height, if the vehicle cruise control is active then selecting a lowered vehicle height; and
(c) adjusting the active suspension system to the desired vehicle height, wherein steps (a) and (b) are performed before step (c).

13. An active suspension system for a vehicle, comprising:
a suspension control module electronically coupled to one or more internal vehicle input(s), one or more external vehicle input(s), and a vehicle cruise control;
an actuator controlled by the suspension control module; and
a sprung mass mechanically coupled to the actuator, wherein the suspension control module uses information from the internal and external vehicle input(s) to drive the actuator and control a vehicle height, and if the vehicle cruise control is active then the suspension control module sets the vehicle height to a lowered vehicle height.

14. An active suspension system for a vehicle, comprising:
a suspension control module electronically coupled to one or more internal vehicle input(s) and one or more external vehicle input(s);
an actuator controlled by the suspension control module; and
a sprung mass mechanically coupled to the actuator, wherein the suspension control module uses information from the internal and external vehicle input(s) to determine if cautionary conditions exist that make adjusting the active suspension system less than ideal and, when there are no cautionary conditions, to drive the actuator and change a vehicle height between a lowered vehicle height for improved fuel efficiency, ride comfort or ride handling, a default vehicle height for typical driving conditions, or a raised vehicle height for certain off-road conditions.

15. The active suspension system of claim 14, wherein the external vehicle input(s) include at least one input selected from the group of short-range external vehicle inputs consisting of: short-range road information, short-range vehicle information, and short-range traffic information.

16. The active suspension system of claim 14, wherein the external vehicle input(s) include at least one input selected from the group of long-range external vehicle inputs consisting of: long-range traffic information, long-range road information, and long-range route information.

17. The active suspension system of claim 14, wherein the suspension control module is coupled to a vehicle-mounted vision system and receives external vehicle input in the form of short-range road information pertaining to an upcoming road surface.

18. The active suspension system of claim 14, wherein the suspension control module is coupled to a vehicle-mounted radar, laser, ladar, or ultrasonic sensor and receives external vehicle input in the form of short-range vehicle information pertaining to a nearby vehicle.

19. The active suspension system of claim 14, wherein the suspension control module is coupled to a vehicle-mounted receiver and receives external vehicle input in the form of short-range traffic information that is provided by a traffic information broadcasting system and pertains to an upcoming stop sign, traffic light, or intersection.

20. The active suspension system of claim 14, wherein the suspension control module is coupled to a GPS-based navigation system and receives external vehicle input in the form of long-range road information that pertains to an upcoming exit ramp, stretch of road, or speed limit change.

21. The active suspension system of claim 14, wherein the suspension control module is coupled to a GPS-based navigation system and receives external vehicle input in the form of long-range route information that pertains to a destination or other aspect of a calculated navigational route.

22. The active suspension system of claim 14, wherein the system is a pneumatic suspension system and the actuator includes an air spring.

* * * * *